United States Patent [19]

Haas et al.

[11] B 4,014,848
[45] Mar. 29, 1977

[54] NON-HARDENING HIGH MOLECULAR WEIGHT TRANS-POLYPENTENAMERS

[75] Inventors: Friedrich Haas, Cologne-Buchheim; Karl Nützel, Opladen; Hans-Joachim Jahn, Cologne-Flittard, all of Germany

[73] Assignee: Bayer Aktiengesellschaft, Germany

[22] Filed: May 17, 1974

[21] Appl. No.: 470,945

[44] Published under the second Trial Voluntary Protest Program on April 13, 1976 as document No. B 470,945.

Related U.S. Application Data

[63] Continuation of Ser. No. 330,641, Feb. 8, 1973, abandoned, which is a continuation of Ser. No. 164,137, July 19, 1971, abandoned, which is a continuation of Ser. No. 813,688, April 4, 1969, abandoned.

[30] Foreign Application Priority Data

Apr. 11, 1968 Germany .......................... 1769149

[52] U.S. Cl. .................. 260/33.6 AQ; 526/41; 526/308; 526/21
[51] Int. Cl.² ..................... C08F 32/04; C08K 5/01
[58] Field of Search .................. 260/33.6 AQ, 93.1

[56] References Cited

UNITED STATES PATENTS

| 2,935,485 | 5/1960 | Reynolds | 260/33.6 AQ |
| 2,964,083 | 12/1960 | Pfau et al. | 260/33.6 AQ |
| 3,458,489 | 7/1969 | Natta et al. | 260/93.1 |

OTHER PUBLICATIONS

Nelson—Petroleum Refinery Engineering (4th ed.) (McGraw-Hill) (N.Y.) (1958), pp. 173–178.
Bruins—Plasticizer Technology (Vol. 1) (Reinhold) (N.Y.) (1965), pp. 26–31.

Primary Examiner—Donald E. Czaja
Assistant Examiner—H. H. Fletcher
Attorney, Agent, or Firm—Connolly and Hutz

[57] ABSTRACT

Vulcanizable mixtures of
a. a high molecular weight polypentenamer containing predominantly trans-bonds having a Mooney viscosity ML4' (100° C.) of from 50 to 200 and
b. from 20 to 100 parts by weight of a plasticizer per 100 parts by weight of polypentenamer.

6 Claims, 1 Drawing Figure

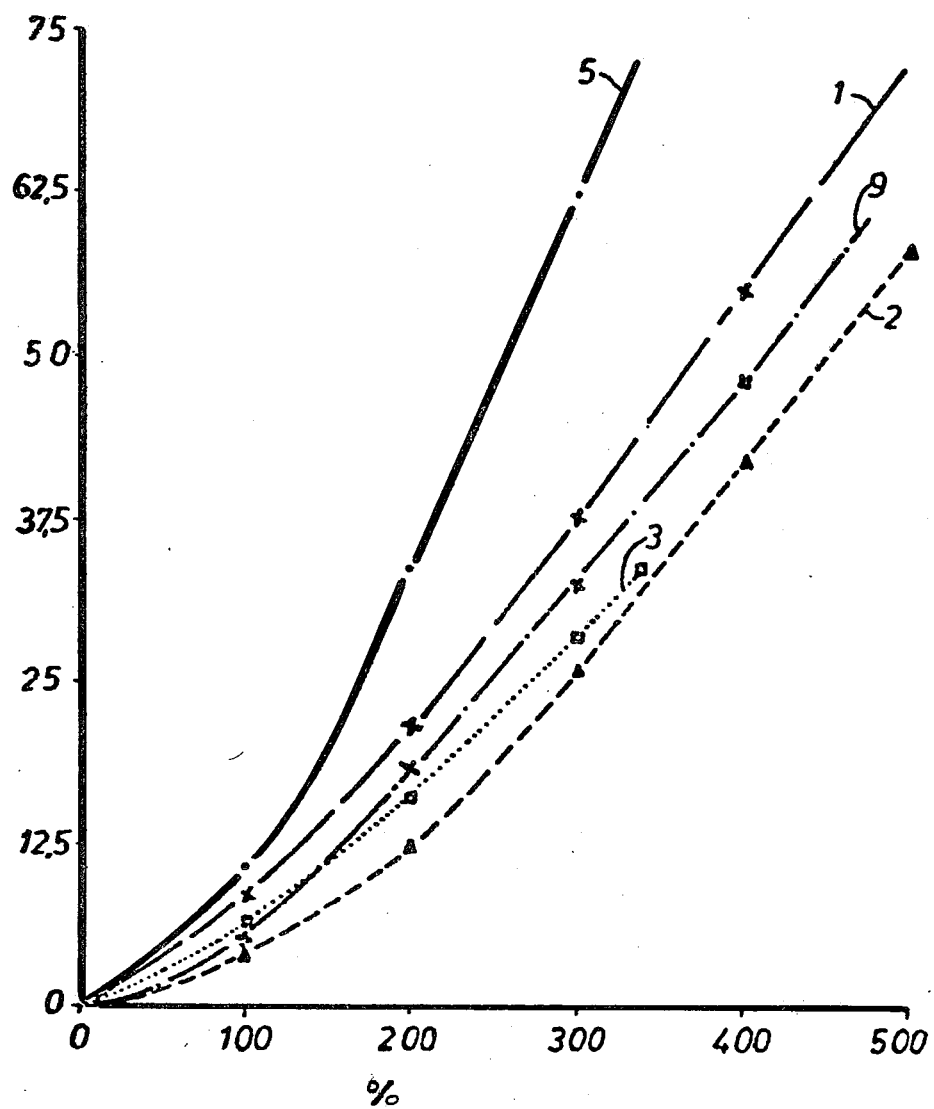

NON-HARDENING HIGH MOLECULAR WEIGHT TRANS-POLYPENTENAMERS

CROSS-REFERENCE TO RELATED APPLICATIONS

This application is a continuation of application Ser. No. 330,641 filed Feb. 8, 1973 and now abandoned, which, in turn, is a continuation of application Ser. No. 164,137 filed July 19, 1971 and now abandoned, which, in turn, is a continuation of application Ser. No. 813,688 filed Apr. 4, 1969 and now abandoned.

It is known that polypentenamers containing predominantly trans-bond components can be obtained by polymerizing cyclopentene with organometallic compounds of the 1st to the IIIrd Groups of the Periodic System, and tungsten compounds. This polymerized material has a crystallisation temperature of +23° C. It is also known that trans-polypentenamer can be vulcanized by means of the conventional vulcanization agents and additives in the presence or absence of fillers.

The vulcanizates undergo appreciable hardening when cooled to just below room temperature. This hardening is due to crystallization of the vulcanized elastomer, as can be shown by appropriate analysis (e.g. differential thermoanalysis, X-ray photographs or dilatometric measurements). This type of hardening is observed when storing the material and occurs spontaneously. The use of the vulcanizates for many purposes is greatly impaired by this type of hardening. This is valid for all applications where dynamic stress or tension occurs at low temperatures as in tires. Stated differently, hardening caused by spontaneous crystallization impairs the elastic properties of rubber parts or systems which are subjected to dynamic stress.

The present invention relates to vulcanizable mixtures of trans-polypentenamers and plasticizers. More particularly, the invention relates to a vulcanizable mixture of a. a high molecular weight polypentenamer containing predominantly (preferably more than 80%) trans-bonds, having a Mooney viscosity ML 4' (100° C.) of from 50 to 200 and having a specific viscosity of from 300 to 1200 cc/g (0.5% by weight solution in toluene at 20° C.), and b. from 20 to 100 parts by weight of plasticizer per 100 parts by weight of polypentenamer.

The invention also relates to vulcanizates of these mixtures.

It is among the objects of this invention to demonstrate that the spontaneous crystallization of cyclopentenamers can be avoided by adding the platicizer without affecting the crystallization which is caused by stretching the material. This latter type of crystallization is essential for good rubber properties, as it causes a self-reinforcing of the material which adds to the strength imparted by fillers. This additional strength is observed in the raw rubber and in its vulcanizates as well.

The fact that crystallization occurs on stretching is very uncommon for synthetic elastomers but is surprisingly found in polypentenamers. Besides trans-polypentenamer only natural rubber shows this effect, especially at lower temperatures. The differences in properties between different rubbers can be shown in a so called strength-elongation-diagram. Such diagrams were made for examples 1,2,3,5 and 9 and are shown in the drawing. The diagram for trans-polypentenamer (5), relating to example 5 is very steep. The diagrams numbered 1,2,3 and 9 refer to the materials described in examples 1,2,3 and 9. Most remarkable is diagram 9 which corresponds to an oil extended trans-polypentenamer. This material has properties, practically identical to natural rubber. The green strength also related to crystallization is very high and indicates properties which have never been found before in a synthetic oil-extended rubber.

Table 2 compares the results of working examples 1 – 9 and shows that trans-polypentenamer is superior in its ability to take up extender oils without losing its advantageous properties, especially its green strength and tack. The only disadvantageous property, crystallization on storage, is removed on oil extension. This can be seen from the values found for the storing behaviour indicated in table 4.

The high molecular weight polypentenamers which may be used in accordance with the invention, can be obtained by known methods, for example by the process referred to above.

Preferred plasticizers that may be used for the mixture according to the invention include paraffinic, naphthenic and aromatic hydrocarbons with molecular weights of 200 to 1500. Some particularly suitable plasticizers include:

1) Mineral oil plasticizers a) Predominantly paraffinic components — 55% by weight
   Density $d_4^{15}$ (g/ml) — 0.85 – 0.95
   Refractive index ($n_D^{20}$) — 1.465 – 1.490
   Aniline point (AP – °C.) — 90 – 127
   Refraction intercept ($n_D - 0.5\, d_4^{20}$) — <1.048
   Viscosity/density constant
   $$\frac{(D-0,24-0,022\,\log.(V_2-35.5))}{0.755}$$ — 0.78 – 0.84 b) With high naphthenic components — 25% by weight of cycloaliphatics
   Density $d_4^{15}$ (g/ml) — 0.87 – 1.0
   Refractive index ($n_D^{20}$) — 1.50 – 1.57
   Aniline point (AP – °C.) — 30 – 90
   Refraction intercept ($n_D - 0.5\, d_4^{20}$) — 1.042 – 1.060
   Viscosity/density constant
   $$\frac{(D-0.24-0.022\,\log.(V_2-35.5))}{0.755}$$ — 0.820 – 0.910 c) With a large component of aromatic hydrocarbons
   Density $d_4^{15}$ (g/ml) — >0.960
   Refractive index ($n_D^{20}$) — 1.55 – 1.60
   Aniline point (AP – °C.) — 5 – 35
   Refraction intercept ($n_D - 0.5\, d_4^{20}$) — >1.055

$$\frac{\text{Viscosity-density constant}}{0.755} \quad (D-0.24-0.22 \log.(V_2-35.5)) \quad >0.901$$

2. Synthetic hydrocarbons
a. Saturated hydrocarbons, for example polyisobutylenes or copolymers of isobutylene, 1-butene, or 2-butene having molecular weight of from 300 to 15000.
b. Unsaturated hydrocarbons, for example polybutadiene, polyisoprene, and copolymers of butadiene and isoprene with olefins such as propylene, butylene and/or aromatic vinyl compounds such as styrene, or vinyl toluene having molecular weights of from 300 – 15000.

3. Natural products such as
Pine tar
Colophony
Cumarones
Linseed oil

4. Synthetic plasticisers such as
Adipic acid esters
Azelaic acid esters
Phosphoric acid esters
Phthalic acid esters
Sebacic acid esters
Hydrocarbons of fairly high molecular weight
Ethers
Thioether esters Although it is known that plasticizers based on hydrocarbons are able within narrow limits to reduce the hardness of the vulcanizates of natural and synthetic elastomers, normal hardening, which occurs when any elastomeric vulcanizate is cooled, is hardly affected by this plasticizer. For this reason, it is surprising and unforeseeable that plasticizers based on hydrocarbons would restore the excessive hardening of trans-polypentenamers to a normal level without impairing the necessary properties, caused by crystallization under stress. This effect is all the more surprising since the excessive hardening of the trans-polypentenamers is practically unaffected in vulcanizates of blends of trans-polypentenamers with elastomers whose vulcanizates do not undergo any appreciable hardening in the event of a reduction in temperature (e.g. 1,4-cis-polybutadiene).

It is surprising that the mixture according to the invention can be processed in critical processing machines (for example roll stands), and mixed with large quantities of fillers (e.g. resins, carbon black and so on). This material is superior in this respect to every known synthetic elastomer including, for example, 1,4-cis-polybutadiene and styrene-butadiene-rubber.

It is also surprising that, even with large plasticizer amounts, the vulcanizates are of outstanding quality, for example in tires for cars and lorries. Their strength and resistance to abrasion deserve particular emphasis, being of a level that usually can only be obtained with blends of 1,4-cis-polybutadiene with natural rubber or styrene-butadiene rubber. It is of course also possible to prepare blends of natural rubber and styrene butadiene rubber in any way with trans-polypentenamers with large plasticizer contents, in which the covulcanization with the natural rubber is surprisingly good. 1,4-cis-polybutadiene, which is comparable in some respects, is known to behave unfavourably when covulcanized with natural rubber (undergoing, for example breaking of treed and build-up of heat under dynamic stress). Another technical advantage of the mixtures of trans-polypentenamers and large quantities of plasticizer and filler is, surprisingly, the astonishingly low accelerator and cross-linking dosage.

The high molecular weight polypentenamers and the plasticizers used according to the invention may be mixed in any way, for example, by mixing on a roll-stand or in an internal mixer. The plasticizer is preferably added to the solution of the polypentenamer in an organic solvent obtained during polymerization, after which the solvent is removed for example by distillation with steam. A particularly uniform distribution is obtained in this way.

As mentioned earlier on, trans-polypentenamers with high viscosities are used in this invention. These viscosities may be obtained during polymerization, either by suitable catalyst dosage and temperature control, or even by treatment after polymerization. In this instance, small quantities of, for example, disulphur chloride, sulphur chloride, thionyl chloride or Friedel-Crafts catalysts such as tin tetrachloride, are added to the solution of the polypentenamer in the organic solvent. It is also possible to use a combination of Friedel-Crafts catalysts and co-catalysts, for example aluminium ethyl dichloride or tert.-butyl chloride. It is possible to prepare vulcanizates with the properties of an elastomer from the mixtures according to the invention. For this purpose, the trans-polypentenamer, optionally together with other rubbers such as natural rubbers, styrene-butadiene rubber or polybutadiene, is mixed with fillers and vulcanization agents. Vulcanization is initiated by heating the mixture. The resulting vulcanizates do not show any tendency towards hardening.

Vulcanization of the mixture can be effected in any conventional way. Essentially a crosslinking agent (predominantly sulphur) and a vulcanization accelerator e.g. a sulphenamide or a thiuram compound is added. Metal oxides such as zinc oxide and higher fatty acids may also be added. The selection of vulcanization systems is generally the same used for other rubbers, e.g. natural rubber or polybutadiene. Trans-polypentenamer, however, needs only very low amounts of accelerators, as compared to natural rubber in order to obtain the same degree of through-vulcanization.

Trans-polypentenamers in the context of this invention means polymers of cyclopentene produced by a ring opening polymerization having more than 50%, preferably 80 – 98% of the double bonds present in trans-configuration. The percentage of trans-configuration is determined by infra-red analysis.

EXAMPLES

Behaviour during vulcanization in mixtures of tire tread quality and their hardening at low temperatures.
Example 1: Natural rubber mixture ring-opening
Example 2: Styrene-butadiene-rubber mixture (SBR)
Example 3: cis-1,4-polybutadiene rubber mixture
Example 4: Natural rubber/cis-1,4-polybutadiene rubber blend mixture 1 : 1
Example 5: trans-polypentenamer rubber mixture Example 6: trans-polypentenamer rubber mixture, incorporating a fairly large quantity of oil
Example 7: Oil/trans-polypentenamer mixture (100 pphr of oil)
Example 8: Oil/trans-polypentenamer/natural rubber blend mixture 2 : 1
Example 9: Oil/trans-polypentenamer mixture (50 pphr of oil).

[In these Examples and the associated Tables, all parts, percentages and ratios are by weight, unless otherwise stated].

Table 1

| Formulations Example | 1 | 2 | 3 | 4 | 5 | 6 | 7 | 8 | 9 |
|---|---|---|---|---|---|---|---|---|---|
| Natural rubber (RSS-N 1) | 100 | — | — | 50 | — | — | — | 50 | — |
| Styrene-butadiene rubber (Type ASTM 1500) | — | 100 | — | — | — | — | — | — | — |
| cis-1,4-polybutadiene (Buna CB 11) | — | — | 100 | 50 | — | — | — | — | — |
| Polypentenamer | — | — | — | — | 100 | — | — | — | — |
| Polypentenamer | — | — | — | — | — | 100 | — | — | — |
| Oil-polypentenamer[1] | — | — | — | — | — | — | 200 | 100 | — |
| Oil-polypentenamer[2] | — | — | — | — | — | — | — | — | 150 |
| Stearic acid | 3 | 3 | 3 | 3 | 3 | 3 | 4 | 3 | 3 |
| ZnO RS | 3 | 3 | 3 | 3 | 3 | 3 | 4 | 3 | 3 |
| ISAF-black | 50 | 50 | 50 | 50 | 50 | 75 | 120 | 75 | 85 |
| Highly aromatic plasticizer | 5 | 5 | 10 | 10 | 10 | 42 | — | — | 3 |
| p-phenylene diamine (4010 NA) | 1 | 1 | 1 | 1 | 1 | 1 | 1.3 | 1 | 1 |
| phenyl α-naphthyl amine (PAN) | 1 | 1 | 1 | 1 | 1 | 1 | 1.3 | 1 | 1 |
| Sulphenamide (Vulcasite CZ) | 0.5 | 1.2 | 1.1 | 1.0 | 0.45 | 0.5 | 1.2 | 0.7 | 0.7 |
| Sulphur | 2.3 | 1.8 | 1.6 | 2.0 | 1.6 | 1.6 | 2.4 | 1.8 | 2.2 |

[1] 100 parts oil per 100 parts rubber
[2] 50 parts oil per 100 parts rubber

TABLE 2

PROPERTIES OF UNVULCANIZED MIXTURES

| Working examples | 1 | 2 | 3 | 4 | 5 | 6 | 7 | 8 | 9 |
|---|---|---|---|---|---|---|---|---|---|
| Tack in g[1] 20°C, pressure: 0.55 kg | >1000 | 600 | 350 | 500 | >1000 | >1000 | 600 | 700 | >1000 |
| Green-Strength[2] Tensile Strength (kgm/cm²) | 16.5 | 4.5 | 3.9 | 5.7 | 14.0 | 9.5 | 7 | 10 | 13 |
| Elongation at break (%) | 880 | 515 | 380 | 770 | 900 | 1000 | 975 | 950 | 755 |

[1] Modified tack meter according to Wallace
[2] Standard die according to DIN 53 504, unvulcanised mixture Table 3

Vulcanization: 4.0 atms, average from the heating stages 20, 30, and 45 minutes
Vulcanizate value:

| EXAMPLE: | 1 | 2 | 3 | 4 | 5 | 6 | 7 | 8 | 9 |
|---|---|---|---|---|---|---|---|---|---|
| Tensile strength (kgf/cm²) DIN 53 504 | 220 | 195 | 110 | 175 | 175 | 135 | 145 | 165 | 145 |
| Breaking elongation (%) DIN 53 504 | 535 | 490 | 505 | 600 | 505 | 550 | 440 | 505 | 460 |
| Modulus at 300/500% elongation (kgf/cm²) DIN 53 504 | 102/204 | 100/— | 58/105 | 67/138 | 94/165 | 61/120 | 91/— | 85 | 85/— |
| Shore-A-hardness at 23°/75°C DIN 53 505 | 63/58 | 64/60 | 60/58 | 60/58 | 64/63 | 61/57 | 64/60 | 61 | 62/58 |
| Rebound elasticity (%) at 23°C DIN 53 512 | 40 | 38 | 42 | 42 | 51 | 38 | 33 | 38 | 37 |
| DIN-abrasion (mm³) (emergy No.60) DIN 53516 | 89 | 73 | 20 | 25 | 23 | 21 | 44 | 36 | 32 |
| Goodrich Flexometer test ASTM-D 629-58 Stroke: 0.0875 inch /T °C b. R.-T. after 25 mins. | 36 | 51 | 56 | 45 | 52 | 49 | 50 | 49 | 39 |

TABLE 4

Hardening 6 mm thick flaps were heated for 30 minutes at 4.0 atms. vapour pressure, and their hardening was determined in dependence upon the period of storage at −5° C. and −20° C. by measuring the Shore-A-hardness.

Hardening at −5° C.
(Shore-A-hardness measured at the storage temperature)

| Storage period(h) | Example: 1 | 2 | 3 | 4 | 5 | 6 | 7 | 8 | 9 |
|---|---|---|---|---|---|---|---|---|---|
| O-Value (Shore-A-hardness at R.T.) | 64 | 65 | 64 | 65 | 66 | 62 | 65 | 59 | 62 |
| 0.5 | 68 | 71 | 67 | 66 | 69 | 67 | 70 | 63 | 66 |

-continued

Hardening at −5° C.
(Shore-A-hardness measured at the storage temperature)

| Storage period(h) | Example: | | | | | | | | |
|---|---|---|---|---|---|---|---|---|---|
| | 1 | 2 | 3 | 4 | 5 | 6 | 7 | 8 | 9 |
| 1 | 68 | 71 | 67 | 67 | 75 | 67 | 70 | 64 | 68 |
| 2 | 68 | 71 | 67 | 68 | 82 | 68 | 70 | 65 | 70 |
| 4 | 68 | 71 | 67 | 69 | 86 | 68 | 70 | 65 | 72 |
| 8 | 68 | 72 | 67 | 69 | 86 | 68 | 71 | 65 | 72 |
| 24 | 68 | 72 | 67 | 69 | 88 | 69 | 71 | 65 | 72 |
| Δ-value | | 4 | 7 | 3 | 4 | 22 | 7 | 6 | 6 | 10 |

Hardening at −20°C.
(Shore-A-hardness measured at the storage temperature)

| Storage period(h) | Example: | | | | | | | | |
|---|---|---|---|---|---|---|---|---|---|
| | 1 | 2 | 3 | 4 | 5 | 6 | 7 | 8 | 9 |
| O-value (Shore-A-hardness at R.T.) | 64 | 65 | 64 | 65 | 66 | 62 | 65 | 59 | 62 |
| 0.3 | 73 | 78 | 69 | 72 | 96 | 75 | 75 | 77 | 68 |
| 0.6 | 74 | 79 | 70 | 73 | 97 | 78 | 76 | 77 | 70 |
| 1 | 74 | 80 | 70 | 73 | 97 | 80 | 78 | 77 | 72 |
| 1.5 | 74 | 81 | 70 | 73 | 97 | 84 | 78 | 78 | 72 |
| 2 | 74 | 81 | 70 | 73 | 97 | 86 | 78 | 78 | 76 |
| 4 | 74 | 81 | 70 | 73 | 97 | 86 | 78 | 79 | 79 |
| 5 | 74 | 81 | 70 | 73 | 97 | 86 | 78 | 79 | 79 |
| Δ-value | 10 | 16 | 6 | 8 | 31 | 24 | 13 | 20 | 17 |

We claim:

1. A composition of matter consisting essentially of (a) a high molecular weight polypentenamer having more than 50% of its double bonds in the trans-configuration obtained by ring-opening polymerization of cyclopentene and having a Mooney viscosity ML 4' (100°C.) of from 50 to 200 and (b) from 20 to 100 parts by weight of a plasticizer per 100 parts by weight of said polypentenamer, said plasticizer being a paraffinic, naphthenic or aromatic hydrocarbon having a molecular weight of from 200 to 1500.

2. A vulcanized product based on the mixture of claim 1.

3. A shaped article of a vulcanizate of the mixture of claim 1.

4. A vulcanizable mixture comprising (a) a high molecular weight polypentenamer having more than 50% of its double bonds in the trans-configuration, obtained by ringopening polymerization of cyclopentene and having a Mooney viscosity ML 4' (100°C.) of from 50 to 200, (b) from 20 to 100 parts by weight of a plasticizer per 100 parts by weight of said polypentenamer, said plasticizer being a paraffinic, naphthenic or aromatic hydrocarbon having a molecular weight of from 200 to 1500 and (c) a vulcanization agent.

5. The vulcanizable mixture of claim 4 wherein the vulcanization agent is sulphur and a sulphenamide.

6. The vulcanizable mixture of claim 4 wherein the vulcanization agent is sulphur and a thiuram compound.

* * * * *